P. D. ROBBINS.
Cotton Cultivators.

No. 152,304.  Patented June 23, 1874.

Witnesses:
H. A. Daniels
Carroll Webster

Inventor:
Parker D. Robbins
by G. H. & W. J. Howard, Att'ys.

UNITED STATES PATENT OFFICE.

PARKER D. ROBBINS, OF HARRELLSVILLE, NORTH CAROLINA.

IMPROVEMENT IN COTTON-CULTIVATORS.

Specification forming part of Letters Patent No. 152,304, dated June 23, 1874; application filed May 1, 1874.

*To all whom it may concern:*

Be it known that I, PARKER D. ROBBINS, of Harrellsville, in the county of Hertford and State of North Carolina, have invented certain Improvements in Cotton-Cultivators; and do hereby declare that the following description, taken in connection with the accompanying drawing, forms a full specification of the same.

My invention has reference to agricultural implements termed cultivators, more especially such as are used in the cultivation of cotton; and the nature thereof consists in certain modifications and improvements in the details of the same, as hereinafter shown and described.

Figure 1:
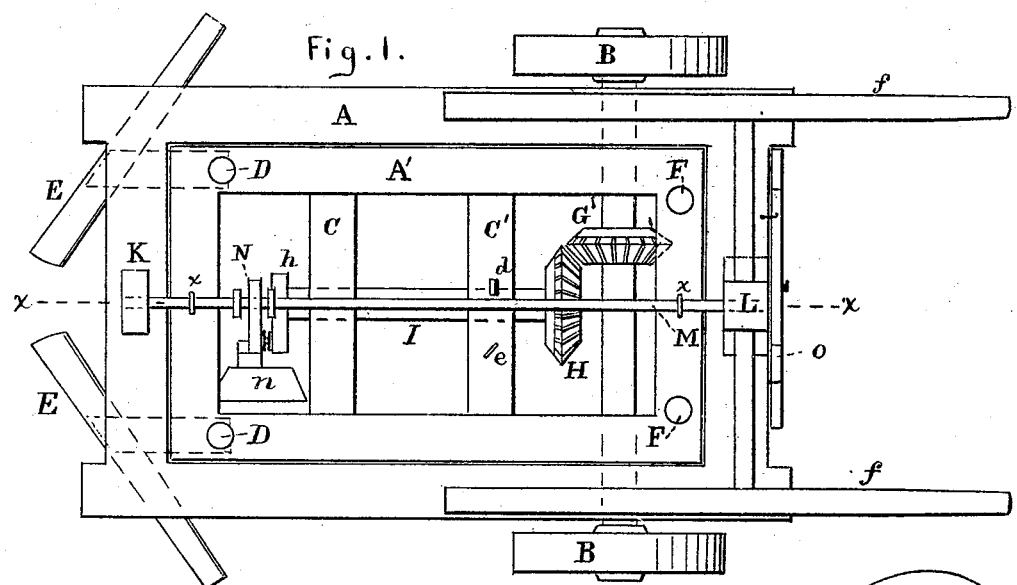
Figure 2:
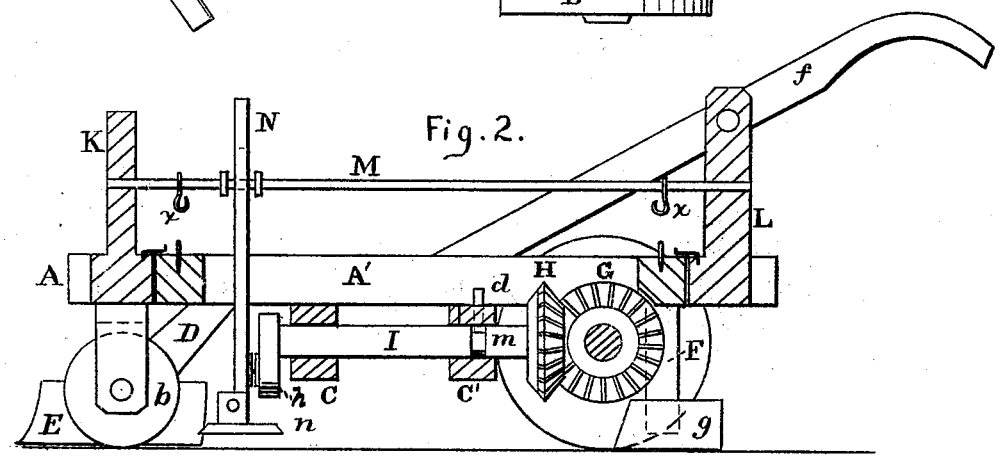
Figure 3:
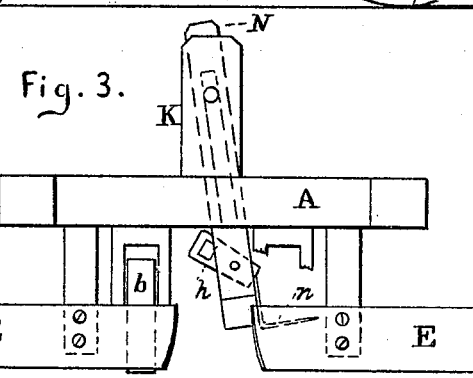

In the accompanying drawing, forming a part of this specification, Figure 1 is a plan view of my improved cultivator. Fig. 2 is a longitudinal section, taken on the line $x\ x$ in Fig. 1. Fig. 3 is a front view.

In the drawing referred to, A designates the frame of the cultivator-vehicle provided with the hind wheels B, which act as driving-wheels, and the small front wheels $b$. Within the said frame A, and fitting loosely therein, is another rectangular, oblong frame, A', which, when the cultivator is in operation, rests upon the cross-beams C C' attached to the under side of frame A. D indicates two standards attached to the front end of the inner frame A', to which standards are attached the shares or cutters E for bearing away, these shares or cutters being of the form shown and in suitable positions for the purpose. At the rear end of the frame A' are the standards F, to which are attached the dirting-shares $g$. The hind wheels B are rigidly attached to the shaft passing from one to the other, the said shaft having its bearings under the frame A. Upon the said shaft, and also rigidly attached thereto, is the beveled gear G, which engages with the beveled gear-wheel H when the cultivator is in operation. The longitudinal shaft I, to one end of which the wheel H is rigidly attached, has its bearings in or under the cross-beams C C', and has fixed to the forward end the crank $h$. The posts K and L stand upon the frame A at the forward and rear ends thereof, the post L supporting the handles $f$. Above the center of the frame is the rod M, extending from the post K to the post L, and passing through the slotted chopper-staff N, which extends downward and has secured to its lower extremity the cotton-chopper $n$. Near the said chopper, and a little above the same, the staff N is pivoted to the crank $h$ on the shaft I, so that each revolution of said shaft causes the chopper to rise and descend, cutting away the surface at each stroke. The shaft I is grooved or sunken at $m$ to admit the pin or bolt $d$, but the gear-wheel H is readily thrown out of gear by withdrawing the bolt $d$ and pushing forward the shaft I, the same being secured by the pin $e$. The dirting-shares $g$ are adjustable in position, the standards thereof being turned by means of the wrench $o$. When not in operation, the machine is converted into a wagon by raising the frame A' and suspending it by means of the hooks $x$ to the horizontal rod M, the handles $f$ being readily removed. The large and small wheels B and $b$ should be made of a proper size with reference to gaging the cutters and dirting-shares, and with a suitable tread. The cutters for leveling and bearing away should be proportioned to the machine, and should extend about an inch farther outward than the wheels in order to level the ground for them.

Having described the construction and operation of my invention, I claim and desire to secure by Letters Patent—

1. The inner frame A', carrying the cutters or scrapers E and shares $g$, fitting within and arranged in relation to the main or outer frame A, and its uprights K L and rod M, as described, so that the said inner frame A' may, when required, be vertically raised and suspended from the said rod M, as and for the purposes specified.

2. In combination with the frame A having the handles $f$, posts K and L, and rod M, the frame A' holding the standards of the cutters and shares, as set forth.

In witness whereof I have hereunto subscribed my name this 17th day of April, 1874, in presence of two witnesses.

PARKER D. ROBBINS.

Witnesses:
 NORMAN L. SHAW,
 T. R. JERNIGAN.